United States Patent
Park (10) Patent No.: US 10,257,398 B2
(45) Date of Patent: Apr. 9, 2019

(54) CAMERA MODULE HAVING A FOCUS ADJUSTING UNIT

(71) Applicant: LG INNOTEK CO., LTD., Seoul (KR)

(72) Inventor: Seung Ryong Park, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 15/500,357

(22) PCT Filed: Jul. 29, 2015

(86) PCT No.: PCT/KR2015/007908
§ 371 (c)(1),
(2) Date: Jan. 30, 2017

(87) PCT Pub. No.: WO2016/021865
PCT Pub. Date: Feb. 11, 2016

(65) Prior Publication Data
US 2017/0223245 A1  Aug. 3, 2017

(30) Foreign Application Priority Data

Aug. 4, 2014  (KR) .......................... 10-2014-0099600

(51) Int. Cl.
*H04N 5/225* (2006.01)
*G03B 13/32* (2006.01)
(Continued)

(52) U.S. Cl.
CPC ............. *H04N 5/2257* (2013.01); *G02B 7/04* (2013.01); *G03B 13/32* (2013.01); *G03B 17/08* (2013.01);
(Continued)

(58) Field of Classification Search
CPC ..... G06T 1/20; G06T 3/4015; H04N 5/23245; H04N 5/374; H04N 9/8042; H04N 19/42
See application file for complete search history.

(56) References Cited

U.S. PATENT DOCUMENTS 6,507,700 B1   1/2003  Takekuma et al.
2003/0193605 A1*  10/2003  Yamaguchi .............. G02B 9/14
                                                                348/335
(Continued)

FOREIGN PATENT DOCUMENTS

EP        2458844 A2    5/2012
KR   20110028767 A    3/2011
(Continued)

OTHER PUBLICATIONS

Supplementary European Search Report dated Mar. 12, 2018 in European Application No. 15829948.7.
(Continued)

*Primary Examiner* — Hung H Lam
(74) *Attorney, Agent, or Firm* — Saliwanchik, Lloyd & Eisenschenk (57) ABSTRACT

The present embodiment relates to a camera module comprising: a first body; a second body coupled to the first body; a lens unit coupled to the second body; a circuit substrate unit located in an internal space formed by the first body and the second body and having an image sensor mounted thereon; and a focusing unit formed in the second body, and moving and fixing the lens unit or the circuit substrate unit in an optical axis direction of the lens unit, wherein a distance between the lens unit and the image sensor in the optical axis direction is adjusted through the focusing unit.

16 Claims, 6 Drawing Sheets

(51) Int. Cl.
*G02B 7/04* (2006.01)
*G03B 17/08* (2006.01)
(52) U.S. Cl.
CPC ......... *H04N 5/2252* (2013.01); *H04N 5/2253* (2013.01); *H04N 5/2254* (2013.01)

(56) References Cited

U.S. PATENT DOCUMENTS

| | | | |
|---|---|---|---|
| 2006/0290801 A1 | 12/2006 | Jao | |
| 2009/0174785 A1* | 7/2009 | Uchida | G02B 7/04 348/222.1 |
| 2009/0225455 A1 | 9/2009 | Kawasaki et al. | |
| 2010/0097519 A1* | 4/2010 | Byrne | B60R 1/00 348/373 |
| 2011/0216197 A1 | 9/2011 | Mulin et al. | |
| 2013/0162894 A1* | 6/2013 | Lee | H04N 5/225 348/373 |

FOREIGN PATENT DOCUMENTS

| | | | |
|---|---|---|---|
| KR | 20110122047 | * 11/2011 | ............ G03B 17/02 |
| KR | 20120003036 A | 1/2012 | |
| KR | 20120016430 A | 2/2012 | |
| KR | 20130056435 A | 5/2013 | |
| KR | 20140084973 A | 7/2014 | |

OTHER PUBLICATIONS

International Search Report in International Application No. PCT/KR2015/007908, filed Jul. 29, 2015.

* cited by examiner

CAMERA MODULE HAVING A FOCUS ADJUSTING UNIT

CROSS-REFERENCE TO RELATED APPLICATIONS

This application is the U.S. national stage application of International Patent Application No. PCT/KR2015/007908, filed Jul. 29, 2015, which claims priority to Korean Application No. 10-2014-0099600, filed Aug. 4, 2014, the disclosures of each of which are incorporated herein by reference in their entirety.

TECHNICAL FIELD

Exemplary embodiments of the present invention generally relate to a camera module.

BACKGROUND

A camera module may include an image sensor, a PCB (Printed Circuit Board) mounted with the image sensor transmitting an electric signal, an IR cut-off filter interrupting a light of an IR area on the image sensor, and an optical system formed with at least one sheet of lens transmitting an image to the image sensor.

A camera module used for a vehicle, unlike a camera module installed on an electronic product such as a mobile device, has its importance in damp proof, water proof and rust resistance because of harsh operating environment. Thus, the camera module may be mounted with a sealing member such as an O-ring at an installation position, or may be coated with a waterproof member such as epoxy or an adhesive. However, the installation of sealing member such as an O-ring alone cannot make perfect a sealing structure at a terminal area formed with a wiring. Particularly, although there is a need requiring minimization of an external size of a camera module in conformity with miniaturization of the camera module, the number of parts are disadvantageously increased in case of a structure for assembling an image sensor circuit board on a mechanism at a lens side, and assemblage or assembling performance deteriorates due to complicated structure caused by loss from circuit board area in response to assembly direction of the circuit board.

For example, in general, a frequently-used vehicle camera module may be largely divided to a lens part and a sensor part. The lens part is configured in such a manner that a lens barrel and a cover member are coupled via a sealing member, and the sensor part is mounted with a plurality of circuit boards inside a body to be coupled to the lens part via at least one sealing member. In this configuration, improvement to cope with the cumbersomeness of providing water proof structure on at least three areas is required, because water proof of a lens, water proof of a sensor and water proof of a mechanical part to match a focus of a lens barrel are in need.

SUMMARY

Technical Challenge

The teachings of the present invention are to provide a camera module capable of being miniaturized and enhanced in operational convenience and water proof.

Technical Solution

In accordance with a first exemplary embodiment of the present invention, there is provided a camera module, the camera module comprising: a first circuit board mounted at an inside thereof with an image sensor; a first body mounted with at least one second circuit board electrically connected to the first circuit board; a second body directly coupled to the first body via a first sealing member; at least one lens directly mounted at an inside of the first body; a focus adjusting unit mounted at the first circuit board to align a focus of the lens and the image sensor by adjusting an optical axis direction position of the second body; and a cover member coupled to an upper end of the second body and mounted with a cover glass.

Preferably, but not necessarily, the focus adjusting unit may be formed at a peripheral surface with a first screw thread, and the first screw thread may be screw-connected to a second screw thread formed at a surface opposite to the first screw thread of the second body to allow adjusting an optical axis direction position of the second body through the screw-connection between a second screw thread of the second body and the first screw thread.

Preferably, but not necessarily, a second sealing member may be interposed between the cover glass and the second body.

Preferably, but not necessarily, the cover member and the second body may be screw-connected.

Preferably, but not necessarily, a floor surface opposite to the focus adjusting unit of the second body may be formed with a concave part corresponding to a shape of the focus adjusting unit.

Preferably, but not necessarily, the second circuit board may be arranged at a bottom side of the first circuit board by being spaced apart at a predetermined distance.

Preferably, but not necessarily, the second circuit board may be configured such that at least two mutually differently-functioning circuit boards are arranged at a bottom side of the first circuit board.

Preferably, but not necessarily, the first and second sealing members may be O-rings.

A camera module according to a second exemplary embodiment of the present invention may be configured such that each of the first circuit board and the second circuit board takes a disk shape.

Preferably, but not necessarily, a diameter of the first circuit board may be formed greater than that of the second circuit board.

Preferably, but not necessarily, the first circuit board may be screw-connected to the first body. To this end, the first body may be configured such that at least one pair of screw support parts may be symmetrically arranged, the first circuit board may be fixed by a screw to an upper side of the screw support part, and the second circuit board may be concavely formed at an area corresponding to the screw support part.

Preferably, but not necessarily, the first body may further include at least one staircase supporting the second circuit board.

Preferably, but not necessarily, the first body and the second body may be screw-connected.

Preferably, but not necessarily, the first sealing member may be interposed between a peripheral surface of the second body and an inner circumferential surface of the first body.

Preferably, but not necessarily, the cover member and the second body may be screw-connected.

A camera module according to a third exemplary embodiment of the present invention may comprise: a first circuit board mounted at an inside thereof with an image sensor; a first body mounted with at least one second circuit board electrically connected to the first circuit board; a second body directly coupled to the first body via a first sealing member; a lens barrel including at least one lens directly mounted at an inside of the second body via a lens fixing unit; a focus adjusting unit mounted at the first circuit board to align a focus of the lens and the image sensor by adjusting an optical axis direction position of the second body, and a cover glass coupled to an upper end of the lens barrel via the second body and the second sealing member.

Preferably, but not necessarily, the focus adjusting unit may be formed at a peripheral surface with a first screw thread, and the first screw thread may be screw-connected to a second screw thread formed at a surface opposite to the first screw thread of the second body to allow adjusting an optical axis direction position of the second body through the screw-connection between a second screw thread of the second body and the first screw thread.

Preferably, but not necessarily, the lens fixing unit may be interposed between an upper side of the focus adjusting unit and a bottom side of the lens barrel.

Preferably, but not necessarily, the lens fixing unit may be formed at a peripheral surface with a third screw thread, and the third screw thread may be screw-connected to the second screw thread, and a lens barrel may be fixedly coupled at an inside of the second body through screw-connection between the second screw thread of the second body and the third screw thread.

A camera module according to a fourth exemplary embodiment of the present invention may comprise: a first circuit board mounted at an inside thereof with an image sensor; at least one second circuit board electrically connected to the first circuit board; a first body mounted with at least one lens coupled to an upper side of the first circuit board via a lens fixing unit; a second body directly coupled to the first body via the first body and a first sealing member; a focus adjusting unit mounted at the second circuit board to align a focus of the lens and the image sensor by adjusting an optical axis direction position of the first and second circuit boards; and a cover glass coupled to an upper end of the lens barrel via the first body and the second sealing member.

Preferably, but not necessarily, the focus adjusting unit may be formed at a peripheral surface with a first screw thread, and the first screw thread may be screw-connected to a second screw thread formed at a surface opposite to the first screw thread of the first body to allow adjusting an optical axis direction position of the first body mounted with the image sensor through the screw-connection between a second screw thread of the first body and the first screw thread.

Preferably, but not necessarily, the lens fixing unit may be interposed between an upper side of the focus adjusting unit and a bottom side of the lens barrel.

Preferably, but not necessarily, the lens fixing unit may be formed at a peripheral surface with a third screw thread, and the third screw thread may be screw-connected to a fourth screw thread formed at a surface opposite to the third screw thread to allow the lens barrel to be fixedly coupled at an inside of the first body through a screw-connection between the second screw thread of the second body and the third screw thread.

A camera module according to an exemplary embodiment of the present invention may comprise: a first body; a second body coupled to the first body; a lens part coupled to the second body; a circuit board part disposed at an inner space formed by the first body and the second body and mounted with an image sensor; and a focus adjusting unit formed at the second body to fix by moving the lens part or the circuit board part to an optical axis direction of lens part, wherein a distance to the optical axis direction between the lens part and the image sensor can be adjusted by the focus adjusting unit.

Preferably, but not necessarily, the focus adjusting unit can move the second body to an optical axis direction of the lens part relative to the first body.

Preferably, but not necessarily, the lens part may include a lens barrel including at least one lens and accommodating the lens, and the focus adjusting unit may include a lens fixing unit moving the lens barrel relative to the second body.

Preferably, but not necessarily, the focus adjusting unit may move the circuit board part relative to the second body.

Preferably, but not necessarily, the focus adjusting unit may include a screw thread formed at an inner surface of the second body.

Preferably, but not necessarily, the focus adjusting unit may further include a body part coupled to the circuit board part, and the body part may include a screw thread coupled to the screw thread formed at the inner surface of the second body.

Preferably, but not necessarily, the second body may further include a concave part formed by a floor surface being caved in to an upper side in order to accommodate the body part.

Preferably, but not necessarily, the lens part may include and a lens barrel including at least one lens and accommodating the lens, wherein the lens barrel may be integrally formed with the second body.

Preferably, but not necessarily, the focus adjusting unit may include a first screw thread formed at a peripheral surface of the second body, and a second screw thread formed at an inner surface of the first body and coupled to the first screw thread.

Preferably, but not necessarily, the camera module may further comprise: a cover glass coupled to an upper surface of the second body, and a cover member fixing the cover glass to an upper surface of the second body.

Preferably, but not necessarily, the lens part may include at least one lens and a lens barrel accommodating the lens, and may further include a cover glass coupled to an upper surface of the lens barrel, and the second body may fix the cover glass to an upper surface of the lens barrel.

Preferably, but not necessarily, the circuit board part may include a first circuit board mounted with an image sensor, and a second circuit board electrically connected to the first circuit board.

Preferably, but not necessarily, each of the first circuit board and the second circuit board may take a disk shape.

Preferably, but not necessarily, the first circuit board may be screw-connected to the first body.

Preferably, but not necessarily, the camera module may further comprise a cushioning member disposed between the circuit board part and the first body, and the circuit board part may be accommodated to the first body through the cushioning member.

Preferably, but not necessarily, the camera module may further comprise a first sealing member interposed between the first body and the second body.

Preferably, but not necessarily, the camera module may further comprise a second sealing member interposed between an upper surface of the second body and the cover glass.

Preferably, but not necessarily, the camera module may further comprise a second sealing member interposed between the second body and the cover glass.

A camera module according to an exemplary embodiment of the present invention may comprise: a first body opened at an upper surface; a second body opened at a bottom surface coupled to the first body; a lens part disposed at the second body; a circuit board part disposed at an inner space formed by the first body and the second body and mounted with an image sensor; and a focus adjusting unit fixing the second body to the first body by moving the second body to an optical axis direction of the lens unit.

A camera module according to an exemplary embodiment of the present invention may comprise: a body; a lens part disposed at an inner space of the body; a circuit board part disposed at an inner space of the body and mounted with an image sensor; and a focus adjusting unit formed at the body and fixing the lens part or the circuit board part by moving to an optical axis direction of the lens part relative to the body.

Advantageous Effect

The advantageous effect of the camera module according to exemplary embodiments of the present invention is that the number of parts can be reduced and use of sealing members can be minimized by forming a first body mounted with circuit boards in one body, and directly coupling a second body integrally formed with a lens barrel mounted with a plurality of lenses to a first body.

Another advantageous effect is that a position freedom (degree of freedom in position) of an image sensor can be obtained, whereby a structure advantageous to application of x, y, z axes active alignment can be obtained.

Still another advantageous effect is that the number of constituent parts for focus adjustment can be minimized, because a screw structure for focus adjustment can be integrally formed at an inside of the first and second body.

DETAILED DESCRIPTION

The camera module according to exemplary embodiments of the present invention will be described with reference to the accompanying drawings.

Figure 1:
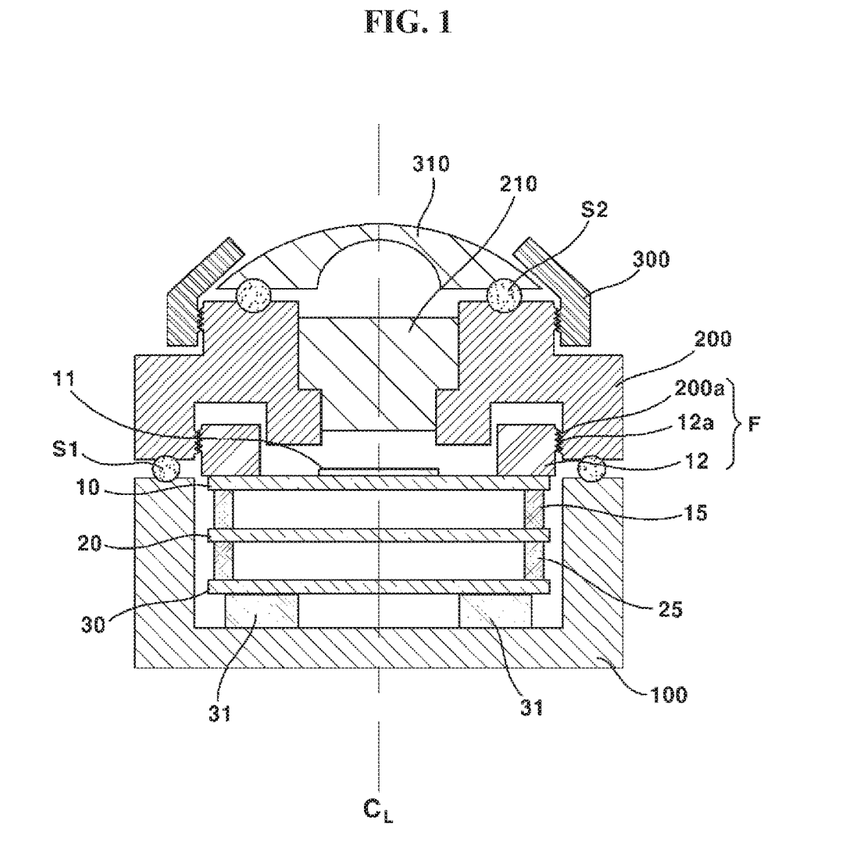
FIG. 1 is a schematic cross-sectional view illustrating a camera module according to a first exemplary embodiment of the present invention.
Figure 2:
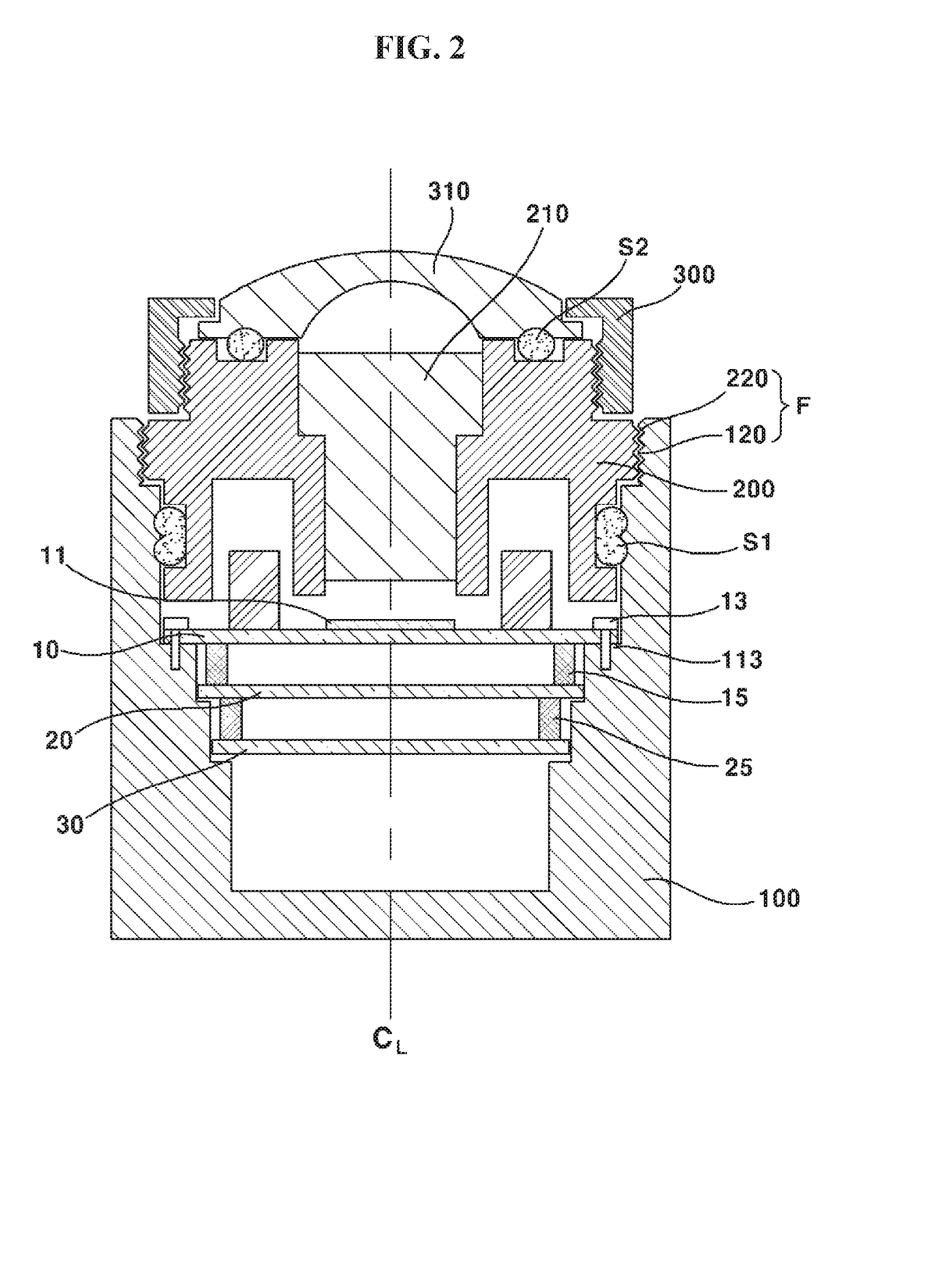
FIG. 2 is a schematic cross-sectional view illustrating a camera module according to a second exemplary embodiment of the present invention.
Figure 3:
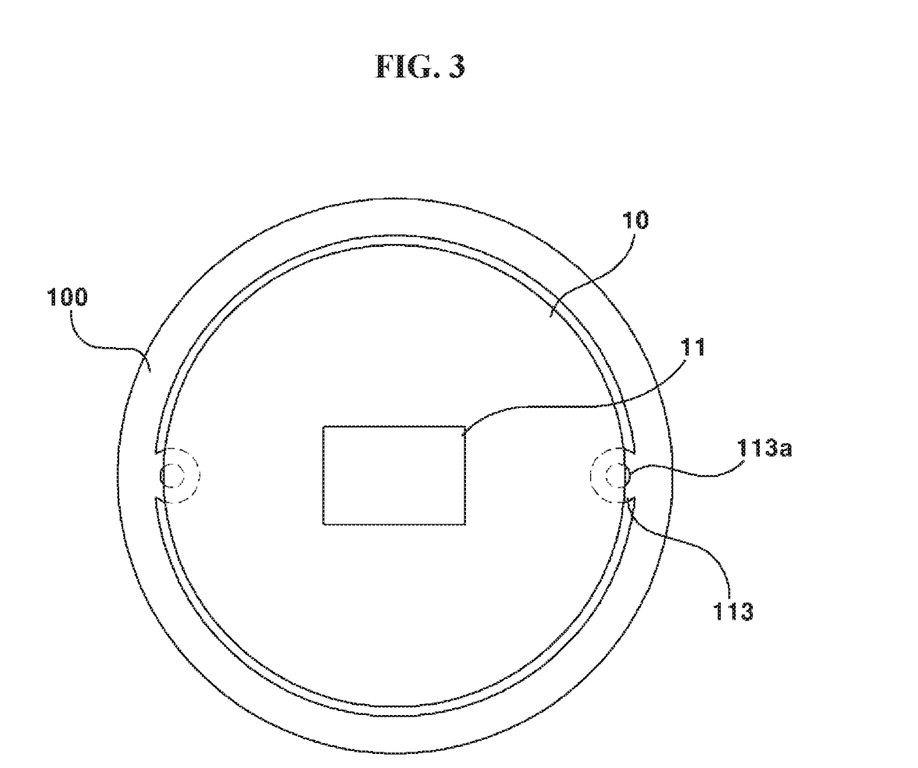
FIGS. 3 and 4 are schematic views illustrating a mounted state of first to third circuit boards.
Figure 4:
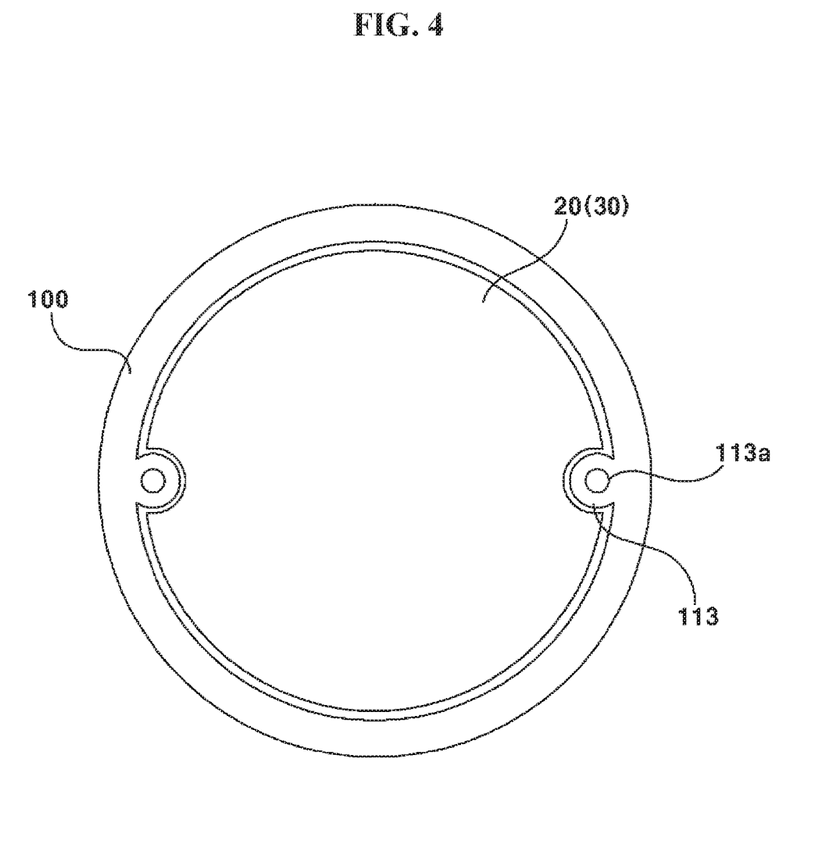
Figure 5:
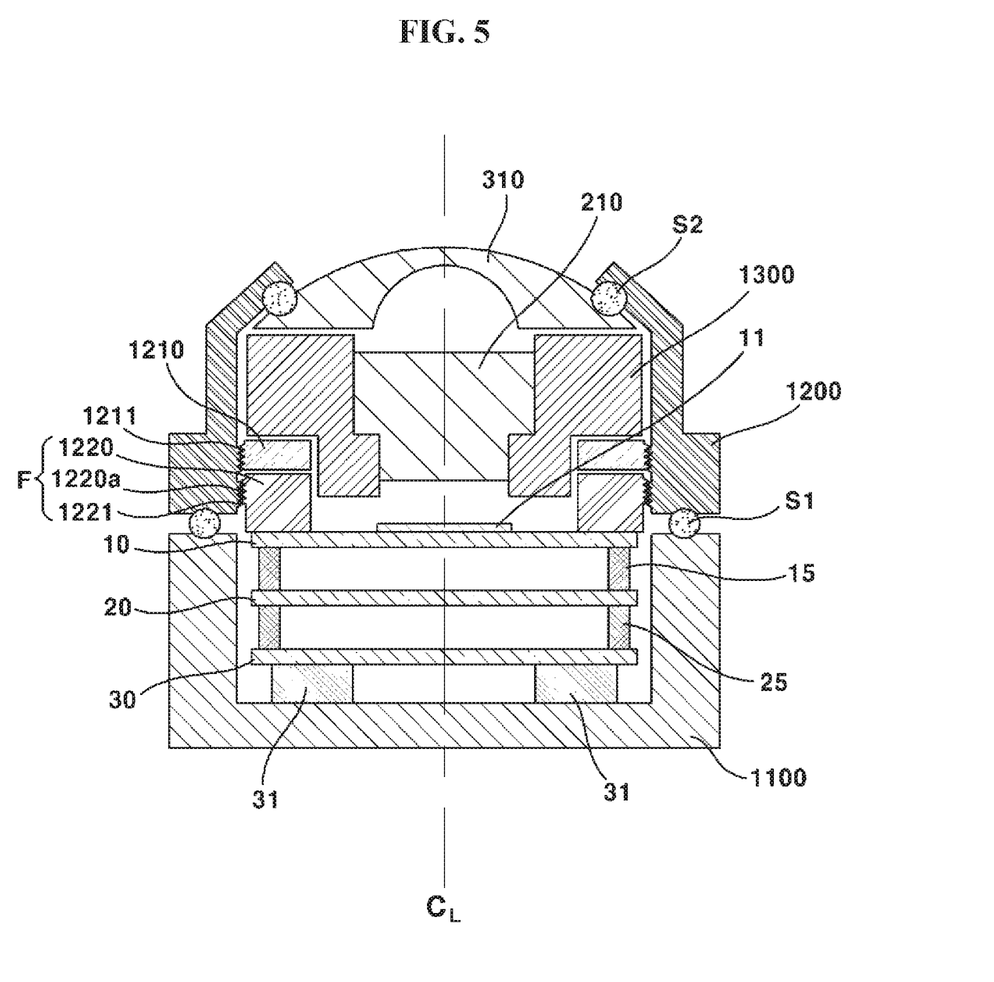
FIG. 5 is a schematic cross-sectional view illustrating a camera module according to a third exemplary embodiment of the present invention.
Figure 6:
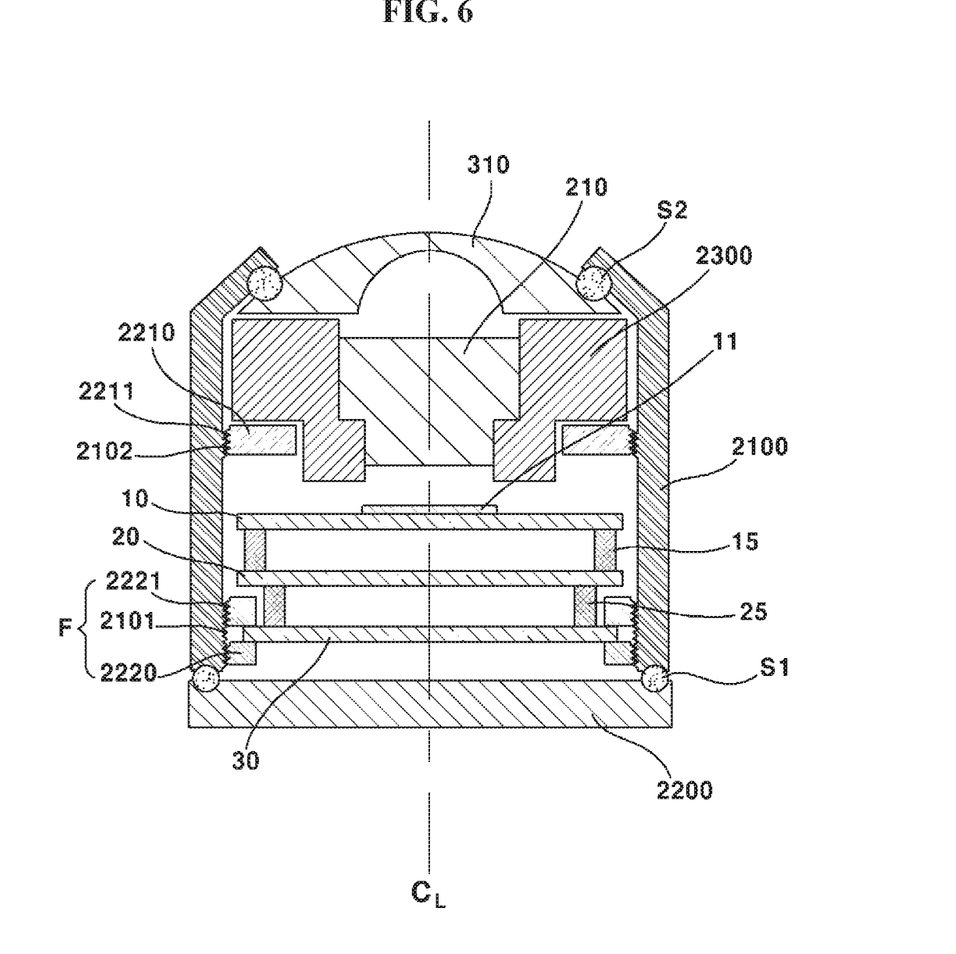
FIG. 6 is a schematic cross-sectional view illustrating a camera module according to a fourth exemplary embodiment of the present invention.

FIG. 1 is a schematic cross-sectional view illustrating a camera module according to a first exemplary embodiment of the present invention, FIG. 2 is a schematic cross-sectional view illustrating a camera module according to a second exemplary embodiment of the present invention, FIGS. 3 and 4 are schematic views illustrating a mounted state of first to third circuit boards, FIG. 5 is a schematic cross-sectional view illustrating a camera module according to a third exemplary embodiment of the present invention, and FIG. 6 is a schematic cross-sectional view illustrating a camera module according to a fourth exemplary embodiment of the present invention.

Hereinafter, a first body (100, 1100, 2200) and a second body (200, 11200, 2100) will be commonly called a body. Meantime, a focus adjusting unit (F) may be used as a concept including a lens fixing unit (1210, 2210).

The camera module according to the first exemplary embodiment of the present invention may include a first body (100), a second body (200) and a cover member (300).

The first body (100) may be formed therein with a space part, and may be mounted with a circuit board part. At this time, the circuit board part may include a first circuit board (10), a second circuit board (20) and a third circuit board (30). In the first exemplary embodiment, the first body (100) may be mounted therein with a first circuit board (10) mounted with an image sensor (11), and second and third circuit boards electrically connected to the first circuit board (10). At this time, the second circuit board (20, 30) may be provided in a plural number, and as illustrated, two sheets of second circuit boards (20, 30) may be mounted at a bottom side of the first circuit board (10) via support members (15, 25) in a state of being spaced apart at a predetermined distance.

At this time, a plurality of cushioning members (31) is formed at a floor surface of the second circuit board (30) to prevent a floor surface of the first body (100) from colliding with the second circuit board (30). The cushioning member (31) may be formed with a material that can easily absorb shocks. The second circuit board (30) may be provided with a logic board or a board for power supply, but the present invention is not limited thereto, and parts necessary for control and driving of a camera module may be also mounted.

Meantime, the first body (100) may be provided in a substantially cylindrical shape. However, the present invention is not limited thereto, and a shape of a rectangular parallelepiped may be also provided. In the present invention, because the first body (100) and the second body (200) are assembly through rotation coupling, a peripheral surface of the first and second bodies (100, 200) may have a diameter, each corresponding to the other.

The second body (200) may be directly coupled to the first body (100) via a first sealing member (S1). The second body (200) may be integrally coupled at an inside thereof by at least one sheet of lens (210), and albeit not being illustrated in the drawings, the second body (200) may be coupled using a separate lens barrel.

A focus adjusting unit (F) may be configured such that a body part (12) is fixedly coupled to an upper surface of the first circuit board (10), and a peripheral surface may be formed with a first screw thread (12a). At this time, an inner surface opposite to the first screw thread of the second body (200) may be provided with a second screw thread (200a), where the first and second screw threads (12a, 200a) may be mutually screw-connected.

Meantime, the first and second circuit boards (10, 20) mounted on the first body (100) are fixed by the cushioning member (31), such that, when the first body (100) is rotated, the first and second circuit boards (10, 20) can rotate with the first body (100). When the first and second bodies (100, 200) are relatively rotated, the focus adjustment can be implemented, because the optical axis direction position of the second body (200) can be changed by the rotation caused by screw-connection between the first and second screw threads (12a, 200a).

The cover member (300) may be coupled to an upper end of the second body (200) and may be mounted with a cover glass (310). The cover member (300) is arranged at an upper end of the uppermost lens in order to prevent foreign objects from entering through the lens (210), and may be formed with a translucent material. Furthermore, the a second sealing member (S2) may be interposed between the cover glass (310) and the lens (210) to prevent foreign objects and moisture from entering the lens (210) side through a connection juncture. At this time, the second sealing member (S2) may be interposed between a floor surface of the cover glass (310) and an upper surface of the second body (200) as illustrated in FIG. 1. However, the present invention is not limited thereto, and the second sealing member (S2) may be variably disposed where sealing is required. Furthermore, the cover member (300) may be screw-connected to the second body (200) as illustrated in the drawings. However, the present invention is not limited thereto and the cover member may be coupled using an adhesive such as epoxy.

The first and second sealing members (S1, S2) may be provided with various materials and shapes, and in general, O-rings may be largely used for the sealing members. At this time, the first sealing member (S1) may have a smaller diameter of the cross-section thereof smaller than that of the second sealing member (S2), as illustrated in FIG. 1.

Meantime, an area opposite to focus adjusting unit body (12a) of the second body (200) may be formed with a corresponding shape of a concave part, as illustrated in FIG. 1. At this time, the concave part may be formed a bit greater in size than the focus adjusting unit body (12a) to prevent interference at a position other than the second body (200) and the second screw thread (200a). At this time, the position of the concave part may be formed at a floor surface side of the second body (200) where there is no interference with an image area of the image sensor (11) as illustrated in the drawings.

FIG. 2 illustrates a camera module according to the second exemplary embodiment of the present invention, where any same functions and configurations as in the first exemplary embodiment will be provided the same reference numerals. At this time, each of the first and second circuit boards (10, 20, 30) may take a disk shape.

Furthermore, a diameter of the first circuit board (10) may be formed greater than that of the second circuit boards (20, 30). \That is, the diameter of the first circuit board arranged at the uppermost side may be formed greatest, and the diameter of at least one of the second circuit boards (20, 30) may be formed smaller than that of the first circuit board (10).

Referring to FIG. 3, the first circuit board (10) may be screw-connected to the first body (100) via a screw (113a). To this end, the first body (100) may be configured such that at least one pair of screw support parts (113) is symmetrically arranged, and the first circuit board (10) is fixed to an upper side of the screw support part (113) using a screw (113a), and the second circuit board (20, 30) may be concavely formed at an area corresponding to the screw support part (113) as illustrated in FIG. 4.

Furthermore, the first body (100), as illustrated in FIG. 2, may further include at least one staircase that supports the second circuit board (20, 30). A diameter of the staircase may be configured to correspond to that of each of the second circuit board (20, 30), and the first and second circuit boards (20, 30) may be spaced apart from each other by support members (15, 25) at a predetermined distance. At this time, the support member (15, 25) may be formed with a conductive material, and may be provided with a terminal and a terminal structure, whereby the first and second circuit boards (20, 30) can be electrically connected.

The difference of the second exemplary embodiment from the first exemplary embodiment is that, although there is no big difference in that the first and second bodies (100, 200) are directly connected in both exemplary embodiments, a connected area between the first and second bodies is formed with a screw thread, and the first and second bodies (100, 200) are screw-connected.

At this time, the first sealing member (S1) may be interposed between a peripheral surface of the second body (200) and an inner surface of the first body (100). Furthermore, the cover member (300) and the cover glass (310) may be screw-connected as in the first exemplary embodiment. Furthermore, the second sealing member (S2) may be arranged at a floor surface side of the cover glass (310), and an upper side of the second body (200) contacting the second sealing member (S2) may be formed with a concave groove accommodated by the second sealing member (S2). The concave groove may be formed a bit greater in diameter than the second sealing member (S2), whereby the second sealing member (S2) can tightly seal a connected area between the second body (200) and the cover glass (310) through elastic deformation. Furthermore, the first sealing member (S1) may be formed greater than the second sealing member (S2) to allow implementing the sealing at a broader area.

Particularly, because a screw-connection is made in such a manner in which the second body (200) is inserted into an inner space of the first body (100), the first sealing member (S1) can tightly seal a space between a peripheral surface of the second body (200) and an inner surface of the first body (100). Furthermore, a focus adjusting unit (F) can be arranged at a place higher than the first sealing member (S1), and a first screw thread (220) forming the focus adjusting unit (F) can be formed at a periphery surface of the second body (200), where a second screw thread (120) corresponding to the first screw thread (220) may be arranged at a surface opposite to the first screw thread (220) of the first body (100).

Referring to FIG. 5, the camera module according to the third exemplary embodiment of the present invention may include a first body (1100), a second body (1200) and a lens barrel (1300).

The first body (1100) has no big difference from the first body in the first exemplary embodiment. That is, the first body (1100) may form a space part at an inside thereof, and may be mounted with a plurality of circuit boards. That is, the first body (1100) may include a first circuit board (10) mounted therein with an image sensor (11) and a second circuit board (20, 30) electrically connected to the first circuit board (10). At this time, the second circuit board (20, 30) may be provided in a plural number and the first circuit board (10) may be mounted at a bottom side with two sheets of second circuit boards (20, 30) each spaced apart, at a predetermined distance via support members (15, 25).

At this time, a floor surface of the second circuit board (30) may be disposed with a plurality of cushioning members (31) to prevent a floor surface of the first body (100) from colliding with the second circuit board (30). The cushioning member (31) may be made of material capable of easily absorb the shocks. The second circuit board (30) may be provided with a logic board or a board for power supply, but the present invention is not limited thereto, and the second circuit board (30) may be mounted with parts necessary for control and driving of the camera module.

Meantime, the first body (1100) may be provided with a substantially cylindrical shape. However, the present invention is not limited thereto, and may be provided with a shape of rectangular parallelepiped. Because the present invention has a configuration of assembling the first and second bodies (1100, 1200) through rotational coupling, a peripheral surface of the first and second bodies (1100, 1200) may have a mutually corresponding diameter.

The second body (1200) may be directly coupled to the first body (1100) via the first sealing member (S1), and may be mounted at an inner space thereof with a lens barrel (1300). The lens barrel (1300) may be coupled to an inside of the second body (1200) using a lens fixing unit (1210), and may be mounted at an inner space with at least one lens (210). The lens barrel (1300) may be provided as a separate part from the second body (1200), as illustrated in the drawings, and may be screw-connected to the lens barrel using the lens fixing unit (1210).

The focus adjusting unit (F) may be mounted at an upper surface of the first circuit board (10) to adjust a focus of the lens (210) and the image sensor (11) by adjusting an optical axis direction position of the second body (1200). The focus adjusting unit (F) may be configured such that a first screw thread (1220a) is formed at a peripheral surface of the body part (1220), and the first screw thread (1220a) may be screw-connected to a second screw thread (1221) formed at a surface opposite to the first screw thread (1220a) to adjust an optical axis direction position of the second body (1200) through the screw-connection between the second screw thread (1221) of the second body (1200) and the first screw thread (1220a).

Meantime, a peripheral surface of the lens fixing unit (1210) may be provided with a third screw thread (1211), where the third screw thread (1211) may be screw-connected to the second screw thread (1221). To this end, the camera module according to the third exemplary embodiment of the present invention is such that the lens fixing unit (1210) may be arranged at an upper side of the focus adjusting unit (F), as illustrated in FIG. 5. That is, the lens fixing unit (120) may be interposed between the focus adjusting unit (F) and the lens barrel (1300).

In the configuration thus described above, when the whole second body (1200) is rotated, the lens barrel (1300) is simultaneously lifted up and down when the second body (1200) is rotated about the first body (1100) to thereby enable adjustment of focus through the rotation operation, because the body part (1220) of the focus adjusting unit (F) is fixed to the first circuit board (10).

Referring to FIG. 6, the camera module according to the fourth exemplary embodiment of the present invention may include a first body (2200) and a second body (2100).

The first body (2200) may be mounted at an inner side thereof with a first circuit board (10), a second circuit board (20, 30) and a lens barrel (2300). The configuration of the first and second circuit boards (20, 30) has no big difference from that of the previous exemplary embodiments, such that any redundant explanation thereto will be omitted. However, the first and second circuit boards according to the fourth exemplary embodiment may be provided in the same size as that of the first exemplary embodiment, and may be spaced apart at a predetermined distance by the support member (15, 25). At this time, the support member (15, 25) may be provided with a terminal and a terminal structure in order to perform the function of wiring member, or may be provided with a separate wiring member.

Meantime, any one of the first and second circuit boards (20, 30) may be provided with the focus adjusting unit (F). The focus adjusting unit (F) may be formed with a first screw part (2221) at a peripheral surface of the body part (2220) mounted at a peripheral surface of the second circuit board (20, 30), and an inner surface of the first body (2200) may be formed with a second screw part (2101) at a position opposite to the first screw part (2221). At this time, the first and second screw parts (2221, 2101) may be arranged at a position near to a floor surface of the first body (2200), the screw connection of which enables fixation and coupling of the first and second circuit boards (10, 20, 30).

Furthermore, third and fourth screw threads (2211, 2102) may be provided in order to fix and couple the lens barrel (2300) at an inside of the first body (2200). The third screw thread (2211) may be formed at a peripheral surface of the lens fixing unit (2210), where the lens fixing unit (2210) may take an approximate ring shape in order to be inserted and coupled to a bottom side of the lens barrel (2300). The fourth screw thread (2102) may be provided at a position opposite to the third screw thread (2211) of the first body (2200), and the fourth screw thread (2102) may be arranged at an area higher than the second screw thread (2101).

Meantime, a floor surface of the first body (2200) may be tightly sealed by the second body (2100), where the second body (2100) may be provided with an approximate disk shape. However, the present invention is not limited thereto and the second body (2100) may be provided with a polygonal shape in response to a shape of the first body (2200). The first sealing member (S1) may be interposed between the first and second bodies (2100, 2200) to prevent foreign objects and moisture from entering the camera module through a joint (connected area)

A cover glass (310) may be coupled to an upper end of the lens barrel (2300) via the first body (2200) and the second sealing member (S2). Meantime, shapes and materials of the first and second sealing members (S1, S2) may be provided in the same manner as those in the previous exemplary embodiments. However, size of the first sealing member (S1) in the fourth exemplary embodiment may be formed relatively smaller than that of the second sealing member (S2).

As noted from the foregoing exemplary embodiments, the camera module becomes simpler in assembly structure over the prior art, whereby the number of constituent parts can be reduced to minimize the joints (connected areas) through which foreign objects can enter.

Inter alia, the manufacturing cost can be decreased and the assembly process can be simplified, because of the reduced use number of sealing members over the prior art.

Furthermore, when the circuit boards are formed in a disk shape, a distance between the lens (210) and the image sensor (11) relative to an optical axis direction ($C_L$) can be changed by rotating the whole first and second circuit boards (10, 20, 30) to thereby enable a simpler performance of active alignment process.

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

The invention claimed is:

1. A camera module, comprising:
a first body;
a second body coupled to the first body;
a lens part coupled to the second body;
a circuit board part disposed at an inner space formed by the first body and the second body and fixed to the first body, and mounted with an image sensor; and
a focus adjusting unit comprising a body part coupled to the circuit board part,
wherein the second body comprises an outer projection part formed on a floor surface and an inner projection part formed on the floor surface,
wherein a concave part is formed between the inner projection part and the outer projection part,
wherein the body part is accommodated in the concave part,
wherein the body part comprises a screw thread coupled to a screw formed at an inner surface of the concave part of the second body, and
wherein a distance in an optical axis direction of the lens part between the lens part and the image sensor can be adjusted by the focus adjusting unit.

2. The camera module of claim 1, wherein the focus adjusting unit moves the second body to an optical axis direction of the lens part relative to the first body.

3. The camera module of claim 1, wherein the focus adjusting unit moves the circuit board part relative to the second body.

4. The camera module of claim 1, wherein a length of the concave part in a direction perpendicular to the optical axis direction is larger than a length of the body part in a direction perpendicular to the optical axis direction.

5. The camera module of claim 1, wherein the body part comprises a screw thread coupled to a screw formed at an inner surface of the outer projection part of the second body.

6. The camera module of claim 1, wherein the body part comprises a screw thread coupled to a screw formed at an outer surface of the inner projection part of the second body.

7. The camera module of claim (claim 1, wherein a lens barrel provided in the lens part is integrally formed with the second body.

8. The camera module of claim 1, wherein the lens part includes a lens barrel including at least one lens and accommodating the lens, and further includes a cover glass coupled to an upper surface of the lens barrel, and the second body fixes the cover glass to an upper surface of the lens barrel.

9. The camera module of claim 1, wherein the circuit board part includes a first circuit board mounted with an image sensor, and a second circuit board electrically connected to the first circuit board.

10. The camera module of claim 9, wherein each of the first circuit board and the second circuit board takes a disk shape.

11. The camera module of claim 9, wherein the first circuit board is screw- connected to the first body.

12. The camera module of claim 1, further comprising a cushioning member disposed between the circuit board part and the first body, wherein the circuit board part is accommodated to the first body through the cushioning member.

13. The camera module of claim 1, further comprising a first sealing member interposed between the first body and the second body.

14. The camera module of claim 8, further comprising a second sealing member interposed between the second body and the cover glass.

15. The camera module of claim 1, further comprising a cover glass coupled to an upper surface of the second body and a second sealing member interposed between the upper surface of the second body and the cover glass.

16. The camera module of claim 1, wherein the lens part comprises at least one lens, and
wherein the concave part is overlapped with the lens part in a horizontal direction.

* * * * *